No. 785,216. Patented March 21, 1905.

UNITED STATES PATENT OFFICE.

JULIUS KANTOROWICZ, OF BRESLAU, GERMANY, ASSIGNOR TO FARBEN-FABRIKEN OF ELBERFELD CO., OF NEW YORK, N. Y., A CORPORATION OF NEW YORK.

STARCH MATERIAL.

SPECIFICATION forming part of Letters Patent No. 785,216, dated March 21, 1905.

Application filed April 8, 1904. Serial No. 202,261.

*To all whom it may concern:*

Be it known that I, JULIUS KANTOROWICZ, manufacturer, residing at Kaiser Wilhelmstrasse 5–7, Breslau, Germany, have invented a new and useful Improvement in New Starch Material, of which the following is a specification.

This invention relates to the manufacture of a new modified form of starch, which has the valuable property of swelling up with cold water to a viscous liquid-like "starch-paste." Such "paste," as is well known, can be obtained from ordinary starch only by treatment with hot water.

For the preparation of the new products any convenient kind of starch—"soluble starch," dextrine, or the like—is mixed with an alcohol (ethyl alcohol, methyl alcohol, &c.) or any other liquid with which starch does not swell up—such as acetone, a mixture of alcohol and ether, or the like—and the resulting mixture is then treated with an aqueous solution of an alkali, neutralized, and the new products isolated.

The following example will serve to illustrate the manner in which my invention can be carried into practical effect. The parts are by weight: One hundred parts of pulverized starch (from potatoes) are mixed at about from 10° to 30° centigrade with such a quantity of ethyl alcohol (fifty to ninety per cent.) as will be necessary to form with the starch a thin milky liquid, wherein the starch remains suspended while stirring. To the reaction mixture thus obtained forty parts of caustic-soda lye (30° Baumé) are added, by which means a thick pulpy mass is obtained, which is allowed to stand for about an hour. It is then neutralized with acetic acid, and the precipitate obtained is filtered off, dried, and ground.

The process proceeds in an analogous manner on at first mixing the starch material with water and then adding to the resulting suspension an alcoholic solution of an alkali, so that the whole reaction mass contains at least about fifty per cent. of alcohol.

The new product thus obtained gives a viscous liquid-like starch-paste on being stirred into about ten times its quantity of cold water.

Having now described my invention and in what manner the same is to be performed, what I claim as new, and desire to secure by Letters Patent, is—

The herein-described new modified form of starch being, when dried and pulverized, a white powder which exhibits the characteristic property of swelling up with cold water to a viscous-mass-like starch-paste, but not dissolving in water like water-soluble starch, substantially as hereinbefore described.

In testimony whereof I have signed my name in the presence of two subscribing witnesses.

JULIUS KANTOROWICZ.

Witnesses:
    ERNST KATZ,
    ALBERT SCHENK.